United States Patent [19]

Vazir-Zadeh

[11] Patent Number: 4,698,831
[45] Date of Patent: Oct. 6, 1987

[54] CMOS INCREMENTER CELL SUITABLE FOR HIGH SPEED OPERATIONS

[75] Inventor: Yousef Vazir-Zadeh, Sunnyvale

[73] Assignee: Advanced Micro Devices, Inc., Sunnyvale, Calif.

[21] Appl. No.: 876,494

[22] Filed: Jun. 20, 1986

[51] Int. Cl.⁴ ...................... H03K 21/38; H03K 23/44
[52] U.S. Cl. ...................................... 377/117; 377/79; 377/81; 377/121
[58] Field of Search .................. 377/79, 81, 115, 116, 377/117, 121

[56] References Cited

U.S. PATENT DOCUMENTS

| | | | |
|---|---|---|---|
| 4,419,762 | 12/1983 | Paul | 377/77 |
| 4,464,774 | 8/1984 | Jennings | 377/115 |
| 4,495,628 | 1/1985 | Zasio | 377/117 |
| 4,587,665 | 5/1986 | Minakuchi | 377/116 |
| 4,611,337 | 9/1986 | Evans | 377/116 |

Primary Examiner—John S. Heyman
Attorney, Agent, or Firm—Patrick T. King; Davis Chin; J. Vincent Tortolano

[57] ABSTRACT

An incrementer cell includes an input section, an output section and a carry section. The input section is responsive to an input data signal and an input carry signal for generating an incremented output signal. The output section is coupled to the input section for generating a data out signal to be either the incremented output signal or the input data signal. The carry section is responsive to the input data signal and the input carry signal for generating a carry-out signal.

16 Claims, 14 Drawing Figures

| CIN | DIN | DINCR |
|---|---|---|
| 0 | 0 | 0 |
| 0 | 1 | 1 |
| 1 | 0 | 1 |
| 1 | 1 | 0 |

} DIN ≡ DINBUF
} DIN NOT ≡ AUXOUT

TRUTH TABLE FOR 'DINCR'

| DIN | CIN | COUT |
|---|---|---|
| 0 | 0 | 0 |
| 0 | 1 | 0 |
| 1 | 0 | 0 |
| 1 | 1 | 1 |

} CIN

TRUTH TABLE FOR 'COUT' DURING THE EVALUATION PERIOD

CMOS INCREMENTER CELL SUITABLE FOR HIGH SPEED OPERATIONS

BACKGROUND OF THE INVENTION

This invention relates generally to semiconductor integrated circuit devices and more particularly, it relates to a CMOS incrementer cell which is operable at high speeds. A number of incrementer cells of the present invention may be connected together to implement a four-bit incrementer, a twelve-bit incrementer and the like without decreasing significantly the operational speed thereof.

There are known in the prior art a number of incrementer circuits, but they tend to suffer from the disadvantage in that as the number of bits to increment is increased the operational speed is slowed down significantly. Further, these prior incrementers tend to be formed of irregular structures which increase substantially the cost in design layout and manufacturing. Moreover, these conventional incrementer circuits are complex and thus require the use of increased amounts of chip area, thereby adding to the expense of production.

It would therefore be desirable to provide a CMOS incrementer cell in which a number of them could be connected together to form an N-bit incrementer so that the operational speed thereof is not significantly reduced as the number of bits is increased. Further, it would be expedient to construct the incrementer cell to be of a regular structure so as to conform to a repeatable pattern suitable for very large scale integration (VSLI) with high packing density.

SUMMARY OF THE INVENTION

Accordingly, it is a general object of the present invention to provide an improved incrementer cell which is relatively simple and economical to manufacture and assemble, but yet overcomes the disadvantages of the prior incrementer circuits.

It is an object of the present invention to provide a CMOS incrementer cell in which a number of them could be connected together to form an N-bit incrementer so that the operational speed thereof is not significantly reduced as the number of bits is increased.

It is another object of the present invention to provide a CMOS incrementer cell which has a regular structure suitable for very large scale integration.

It is still another object of the present invention to provide an incrementer cell which is formed of an input section, an output section and a carry section for generating an incremented output signal and a carry-out signal.

It is yet still another object of the present invention to provide a decrementer cell which is substantially identical in construction to the incrementer cell.

In accordance with these aims and objectives, the present invention is concerned with the provision of an incrementer cell which is formed of an input section, an output section and a carry section. The input section is responsive to an input data signal and an input carry signal for generating an incremented output signal. The output section is coupled to the input section for generating a data out signal which is either the incremented output signal or the input data signal. The carry section is responsive to the input data signal and the input carry signal for generating a carry-out signal.

In another aspect of the invention, four of the incrementer cells of the present invention are arrayed to form a 4-bit incrementer in which auxiliary connections are made between the various cells so as to speed up the time for generating the carry-out signal in the highest bit.

In still another aspect of the present invention, three of the 4-bit incrementers are arranged to form a 12-bit incrementer. By using the principles of the present invention, a 16-bit incrementer can also be formed by utilizing four of the 4-bit incrementers so as to achieve a higher bit count without increasing significantly the increment time.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein.

DESCRIPTION OF THE PREFERRED EMBODIMENTS

Figure 1A:
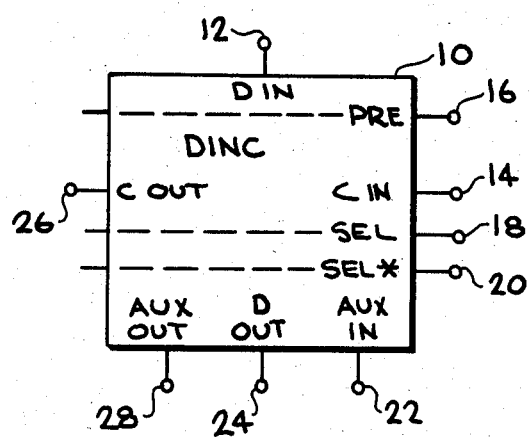
FIG. 1(a) is a block diagram of an incrementer cell of the present invention.

Referring now in detail to the drawings, there is shown in FIG. 1(a) a block diagram of a CMOS incrementer cell 10 of the present invention designated as DNIC. The incrementer cell 10 receives six input logic signals consisting of an input data signal DIN on terminal 12, an input carry signal CIN on terminal 14, a precharge clock signal PRE on terminal 16, a select control signal SEL on terminal 18, a signal SEL* on terminal 20 which is a complement of the select control signal, and an auxiliary input signal AUXIN on terminal 22. The incrementer cell 10 provides three output signals consisting of a data out signal DOUT on terminal 24, a carry-out signal COUT on terminal 26, and an auxiliary output signal AUXOUT on terminal 28.

Figure 1B:
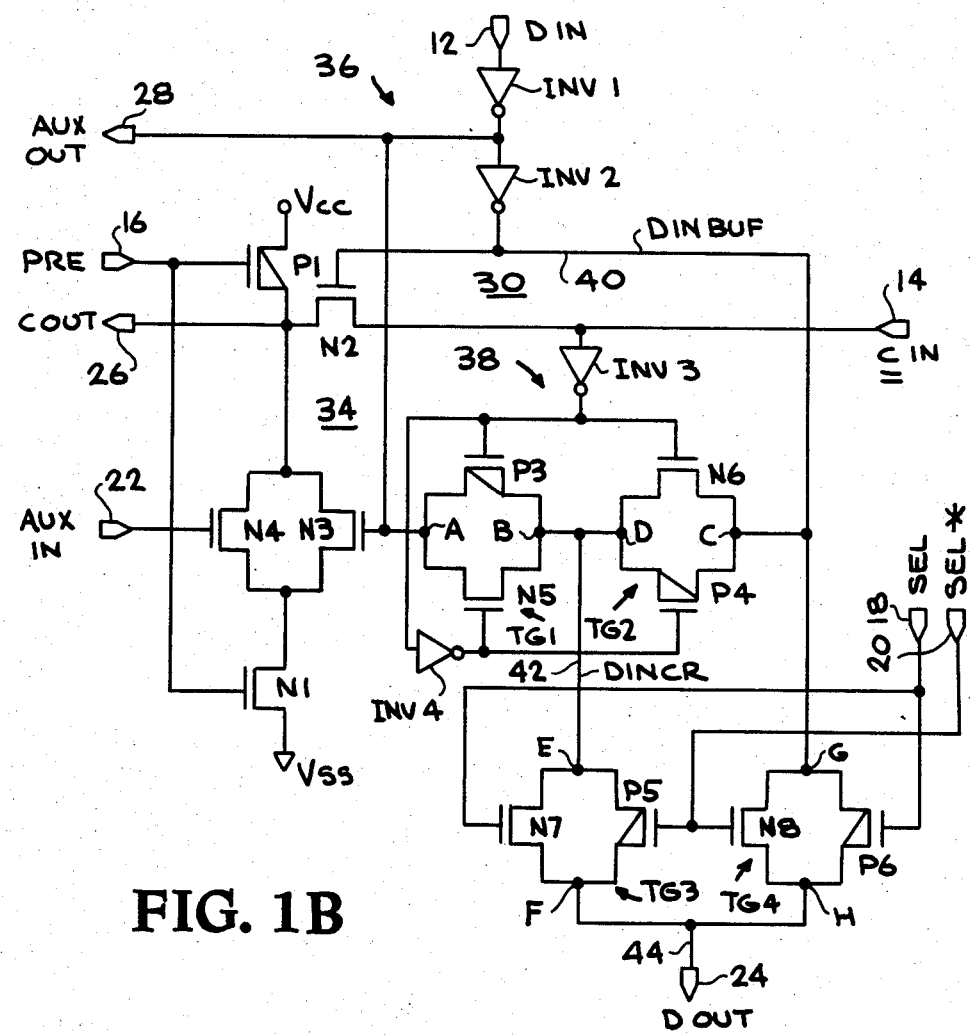
FIG. 1(b) is a detailed schematic circuit diagram of the incrementer cell of FIG. 1(a)

IN FIG. 1(b), there is illustrated a detailed schematic circuit diagram of the CMOS incrementer or DINC cell of FIG. 1(a). The DINC cell is formed of an input section 30, an output section 32, and a carry section 34. The input section 30 performs the increment operation and consists of a buffer stage 36 and an incrementer stage 38. The buffer stage 36 includes a first inverter INV1 having its input connected to the terminal 12 for receiving the input data signal DIN and a second inverter INV2 having its input connected to the output of the first inverter INV1. The output of the first inverter INV1 is also connected to the terminal 28 for providing the auxiliary output signal AUXOUT. Thus, the output signal AUXOUT is the complement of the input data signal DIN. The output of the second inverter INV2 defines the output of the buffer stage 36 which is on line 40 referred to as an intermediate signal DINBUF. This signal DINBUF has the same logic value as the input data signal DIN.

The incrementer stage 38 is formed of a multiplexer circuit which includes a third inverter INV3, a fourth inverter INV4, a first transmission gate TG1, and a second transmission gate TG2. The third inverter INV3 has its input connected to the terminal 14 for receiving the input carry signal CIN, and the fourth inverter INV4 has its input connected to the output of the third inverter INV3. The first transmission gate TG1 is formed of a P-channel transistor P3 and an N-channel transistor N5 having their main electrodes connected in parallel to provide an input node A and an output node B. The second transmission gate TG2 is formed of a P-channel transistor P4 and an N-channel transistor N6 having their main electrodes connected in parallel to provide an input node C and an output node D. The input node A is connected to the output of the first inverter INV1, and the input node C is connected to the output of the second inverter INV2. The output nodes B and D are connected together and to a line 42 referred to as an incremented signal DINCR. The output of the third inverter INV3 provides a control signal and is connected to the control terminals or gates of the transistors P3 and N6. The output of the fourth inverter INV4 also provides a control signal and is connected to the control terminals or gates of the transistors N5 and P4. Each of the inverters is a conventional CMOS inverter formed of a P-channel MOS transistor and an N-channel MOS transistor.

As is generally known, a multiplexer circuit is one where the output thereof may be selected from one of several inputs under the control of a further input. The multiplexer or incrementer stage 38 generates the incremented output signal DINCR on the line 42 which may be either the auxiliary output signal AUXOUT or the intermediate signal DINBUF depending upon the logic state of the input carry signal CIN. As can be seen from the truth table in FIG. 2, when CIN=0 the incremented output signal DINCR is equal to the intermediate signal DINBUF (DINCR=DINBUF), and when the CIN=1 the incremented output signal DINCR is equal to the complement of the input data signal DIN or AUXOUT (DINCR=AUXOUT). Accordingly, it will be noted that the input section 30 does indeed perform the increment operation since in binary logic the incremented value of a particular bit has the logical inverse value of that bit.

The output section 32 functions to select either the incremented or the non-incremented value of the input data signal DIN. The output section 32 comprises a multiplexer circuit which includes a third transmission gate TG3 and a fourth transmission gate TG4. The transmission gate TG3 is formed of a P-channel transistor P5 and an N-channel transistor N7 having their main electrodes connected in parallel to provide an input node E and an output node F. The transmission gate TG4 is formed of a P-channel transistor P6 and an N-channel transistor N8 having their main electrodes connected in parallel to provide an input node G and an output node H. The output nodes F and H are connected together and to the terminal 24 via line 44 so as to provide the data out signal DOUT. The select control signal SEL on the terminal 18 is connected to the control electrodes or gates of the transistors N7 and P6. The signal SEL* or the complement of the select control signal SEL on the terminal 20 is connected to the control electrodes or gates of the transistors P5 and N8. When the select control signal SEL is high, the incremented output signal DINCR is selected which is passed to the output of the output section 32 to provide the data out signal DOUT. On the other hand, when the select control signal SEL is low the non-incremented signal DINBUF is selected which is passed to the terminal 24.

Figures 2, 3, 4:
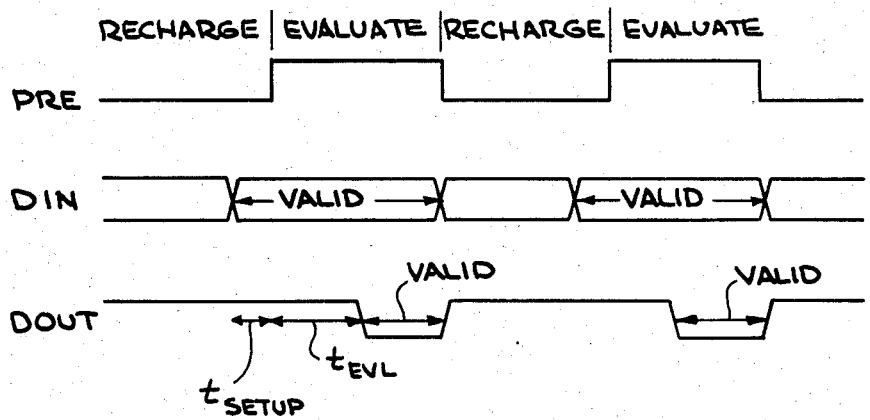
FIG. 2 is the truth table for the input section of the incrementer cell in FIG. 1(b)
FIG. 3 is the truth table for the carry section in the incrementer cell in FIG. 1(b)
FIG. 4 is a timing diagram useful in understanding the operation of the incrementer cell in FIG. 1(b)

The carry section 34 functions to generate the carry-out signal COUT at the terminal 26 which is operated in accordance with the truth table shown in FIG. 3. The carry section 34 is a "dynamic" circuit which is defined to be a circuit that performs an operation under the control of clock pulses. The carry section 34 includes a P-channel transistor P1 and four N-channel transistors N1, N2, N3 and N4. The transistor P1 has its source connected to a supply potential VCC which is typically at +5.0 volts. The drain of the transistor P1 is connected to the source of the transistor N2, to the terminal 26 to provide the carry-out signal COUT, and to the common drains of the transistors N3 and N4. The transistor N2 has its drain connected to the terminal 14 for receiving the input carry signal CIN and its gate connected to the output of the second inverter INV2 in the buffer stage. The sources of the transistors N3 and N4 are also connected together and to the drain of the transistor N1. The gate of the transistor N3 is connected to the output of the first inverter INV1 in the buffer stage, and the gate of the transistor N4 is connected to the terminal 22 for receiving the auxiliary input signal AUXIN. The transistor N1 has its source connected to a low voltage VSS which is at or near the ground potential. The gate of the transistor N1 is connected to the gate of the transistor P1 and to the terminal 16 for receiving the precharge clock signal PRE.

FIG. 4(a)-4(c) is a timing diagram which is useful in understanding the operation of the incrementer cell 10 of FIG. 1(b). Associated circuitry which is not a part of this invention generates the precharge clock pulses PRE which may have a frequency in the order of 20 MHz. The carry-out signal COUT is precharged to a high voltage when the clock pulses PRE are at the low or "0" logic level and is evaluated during the time when the clock pulses PRE are at the high or "1" logic level, as is illustrated in FIG. 4(a). As is typical with dynamic circuits, the input data DIN shown in FIG. 4(b) must be valid prior to the rising edge of the precharge clock pulses PRE and must remain valid during the evaluation period. Further, there is sometimes required a set-up time which must be met as well.

Referring again to FIG. 1(b), during the precharge portion of the clock pulses, the transistor P1 is turned on and the transistor N1 is turned off. Thus, the carry-out signal COUT will be precharged to a high voltage regardless of whether the transistor N2 is turned on or off. During the evaluation portion of the clock pulses, the transistor P1 is turned off and the transistor N1 is turned on. Assuming that the input data signal DIN is at a low logic level, the carry-out signal COUT must be at a low logic level as indicated by the truth table of FIG. 3. This is accomplished through discharging of the high voltage existing at the terminal 26 during the precharge portion by turning on the transistor N1. It will be noted that the transistor N3 will already be turned on since its gate connected to the output of the inverter INV1, which is the complement of the input data signal DIN, is at a high logic level. On the other hand, when the input data signal DIN is at a high logic level, the carry-out signal COUT must have the same logic state as the input carry signal CIN as shown in the truth table of FIG. 3. This is accomplished by turning on the transistor N2. As can be seen, the transistor N2 will indeed be turned on since its gate connected to the output of the inverter INV2, which is at the same logic level as the input data signal DIN, is at a high logic level.

Figure 5A:
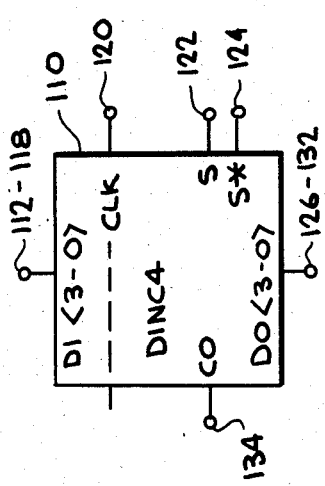
FIG. 5(a) is a block diagram of a 4-bit incrementer, using the principles of the present invention.

Any number of increment or DINC cells 10 can be arrayed to implement an N-bit incrementer. With reference to FIG. 5(a), there is illustrated in block form a four-bit incrementer 110, which is exemplary, of the present invention designated as DINC4. The incrementer 110 receives four input data signals DI<3 . . . 0> on respective terminals 112, 114, 116 and 118; a precharge clock signal CLK on terminal 120; a select signal S on terminal 122; and a signal S* on terminal 124 which is a complement of the select control signal S. The incrementer 110 provides four data out signals on respective lines 126, 128, 130 and 132; and a carry-out signal CO on line 134.

Figure 5B:
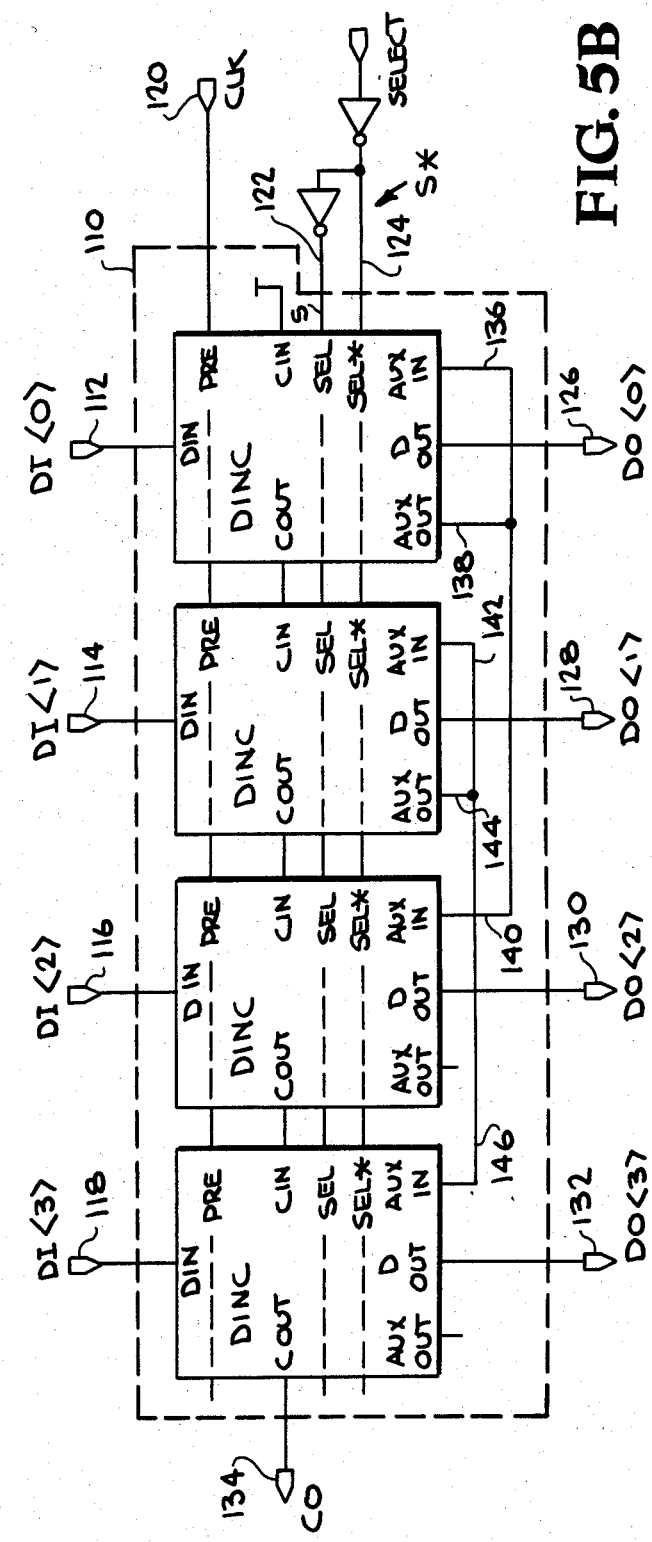
FIG. 5(b) is a more detailed block diagram of the 4-bit incrementer shown in FIG. 5(a)

In FIG. 5(b), there is illustrated a more detailed block diagram of the four-bit incrementer DINC4 of FIG. 5(a), which is formed of four incrementer cells DINC0 . . . DINC3. Each of the incrementer cells DINC0 . . . DINC3 comprises circuit elements identical to those previously discussed above regarding the DINC cell 10 in FIG. 1(b). As can be seen, the input carry signal CIN for the cell DINC0 or bit zero must always be at a high voltage since the input data signal DI<0> is always to be incremented. The input signals CLK, S and S* are connected to each of the cells DINC0 . . . DINC3. The input carry signal of the ith cell is the carry-out signal of the ith-1 cell where i=1, 2 and 3, with the exception of the 0th cell being connected to a high voltage such as the supply voltage VCC.

The timing diagram for the incrementer DINC4 is the same as the one for the incrementer cell 10 shown in FIG. 4. In other words, the four input data signals DI<3 . . . 0> must be valid prior to the rising edge of the precharge clock signal CLK and must stay valid as long as the signal CLK is in the high logic level. Again, the select signals S and S* are used to select between the incremented and the non-incremented values of the input data signals. The carry-out signal CO is generated independent of the state of the select signals. The terminals for the auxiliary input signal and the auxiliary output signal for the cell DINC0 are connected together via lines 136 and 138 and to the terminal for the auxiliary input signal for the cell DINC2 via line 140. The terminals for the auxiliary input and the auxiliary output for the cell DINC1 are connected together via lines 142 and 144 and to the terminal for the auxiliary input for the cell DINC3 via line 146. These connections of the auxiliary input and auxiliary output terminals are used to speed up the evaluation time of the carry-out signal CO.

Figure 6A:
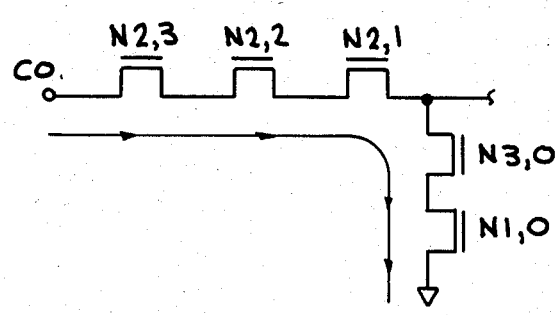
FIG. 6(a) shows the worst case discharge path for the 4-bit incrementer without any auxiliary connections.
Figure 6B:
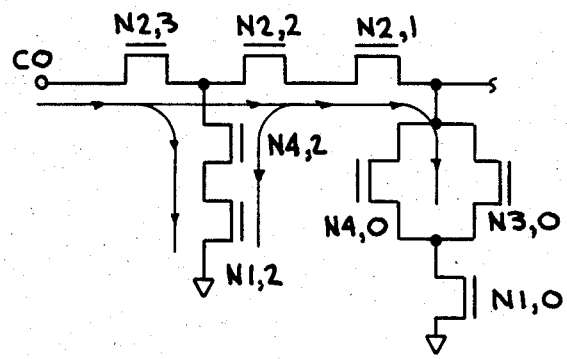
FIG. 6(b) shows the worst case discharge path for the 4-bit incrementer with the auxiliary connections.

In order to illustrate how the evaluation time is reduced by the auxiliary connections, reference is made to FIG. 6(a) showing the discharge path for the carry-out signal CO without any auxiliary connections and to FIG. 6(b) showing the discharge path for the carry-out signal CO with the auxiliary connections. In particular, since the carry-out signal CO is precharged to a high voltage, it will be noted that the worst-case evaluation time occurs when the four input data signals DI<3 . . . 0> = 1110. With such input data signals and when the precharged clock signal CLK=1, then the incremented value must be DO<3 . . . 0> = 1111 with a no carry-out signal, ie, CO=0. In FIG. 6(a), there is shown the transistors in the discharge path for the carry-out signal CO without any auxiliary connections. Each transistor designation includes a second number corresponding to the bit in which that transistor belongs. For example, the designation N2,3 refers to the transistor N2 which is in the third bit. The highest numbered bit (third) is the most significant bit and the lowest numbered bit (zero bit) is the least significant bit. In the worst case, all of the transistors depicted in FIG. 6(a) are turned on so that the no carry-out signal CO must propagate from the least significant bit to the most significant bit.

Since it has been recognized when a zero exists in any bit of the four input data signals DI<3 . . . 0> a no carry-out signal must be generated, the carry-out signal CO can be pulled to a low voltage (CO=0) without having to wait for a no carry-out signal to propagate through each bit. In FIG. 6(b), there is shown the transistors in a second discharge path created by the auxiliary connection previously discussed above with respect to FIG. 5(b). As will be noted, the second discharge path is through the transistors N2,3; N4,2 and N1,2 which is much shorter than the earlier path.

Figure 7A:
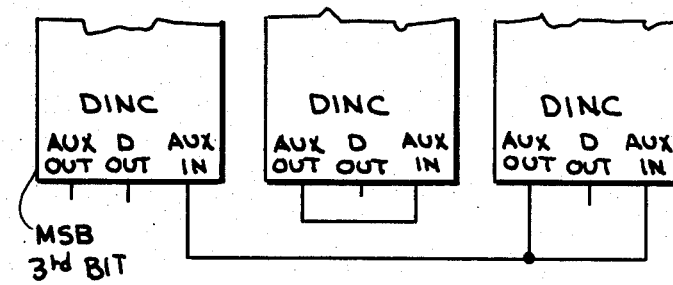
FIG. 7(a) shows the auxiliary connections for a 3-bit incrementer.
Figure 7B:
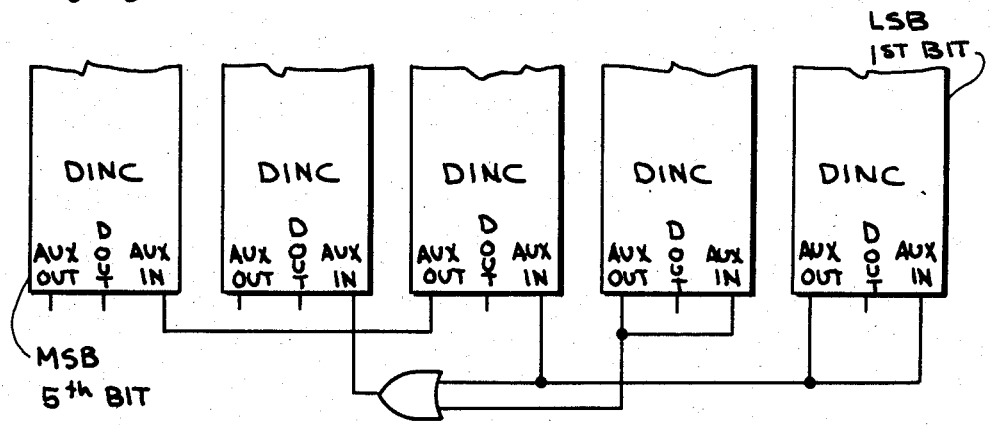
FIG. 7(b) shows the auxiliary connections for a 5-bit incrementer.

While there has been discussed in detail the four-bit incrementer 110 with auxiliary connections illustrated in FIGS. 5 and 6, it should be understood to those skilled in the art that a 3-bit or 5-bit incrementer or N-bit incrementer could be just as easily arrayed with auxiliary connections to speed up the evaluation time. By way of examples, there are shown the auxiliary connections for a 3-bit incrementer and a 5-bit incrementer in respective FIG. 7(a) and FIG. 7(b).

Figure 8:
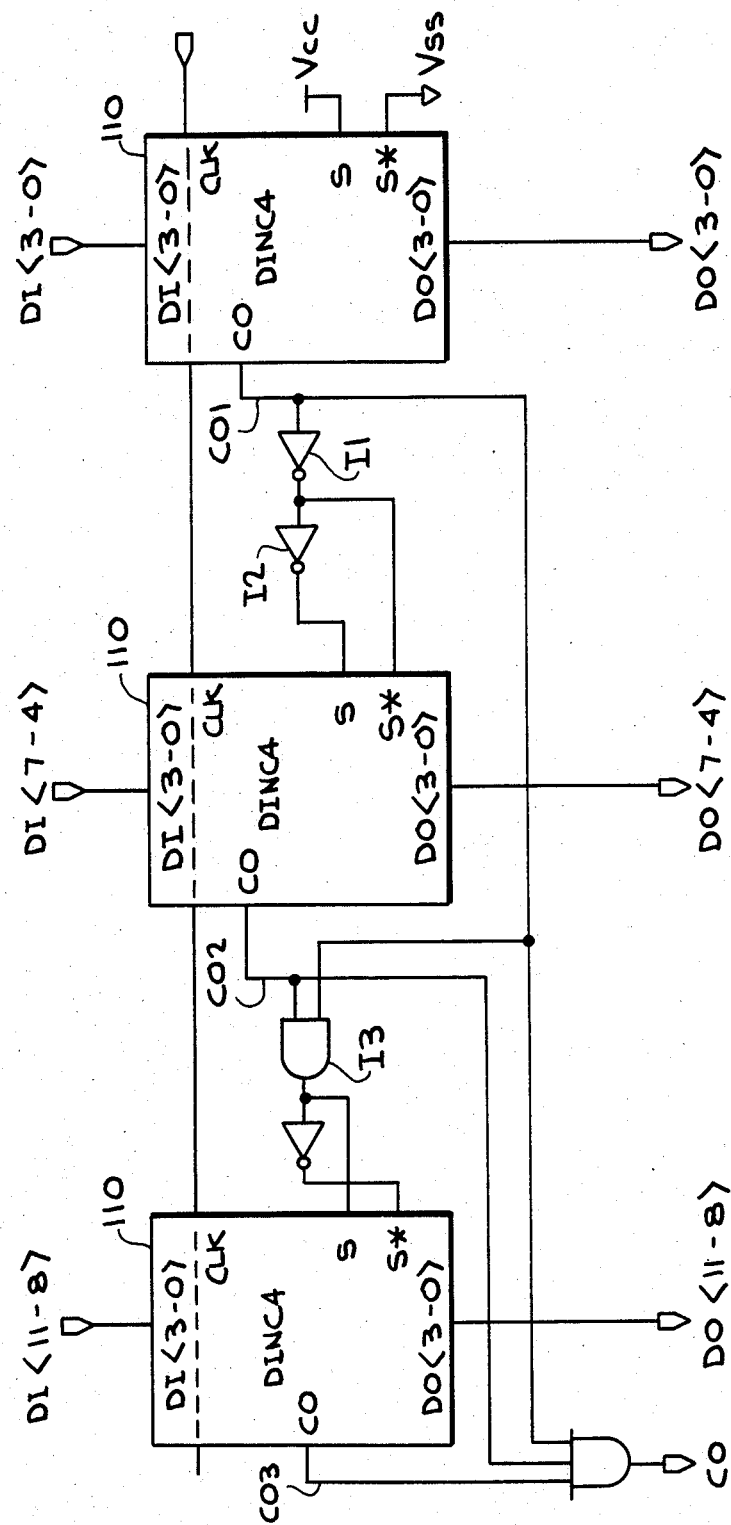
FIG. 8 shows a block diagram of a 12I-bit incrementer, using the principles of the present invention.

In order to form a 12-bit incrementer, it would be possible to array twelve DINC cells 10. Alternatively, it has been discovered that it would be more expedient to implement a 12-bit incrementer by arraying three 4-bit incrementers DINC4. FIG. 8 illustrates how such three DINC4 blocks of FIG. 5(a) could be interconnected to form the 12-bit incrementer. As can be seen, a precharge signal CLK is connected to each of the blocks DINC4. The block DINC4(a) receives four input data signals DI<3 . . . 0> and generates four output data signals DO<3 . . . 0>. The block DINC4(b) receives four input data signals DI<7 . . . 4> and generates four output data signals DO<7 . . . 4>. The block DINC4(c) receives four input data signals DI<11 . . . 8> and generates four output data signals DO<11 . . . 8>. The carry-out signals CO3, CO2 and CO1 from the respective blocks DINC4(a), DINC4(b) and DINC4(c) are evaluated independently of each other during the evaluation cycle.

Since the output data signal DO<3 . . . 0> always assumes the incremented value of the input data signals DI<3 . . . 0>, the select control signals for the block DINC4(a) is connected to the high voltage or supply potential VCC. The output data signal DO<7...4> assumes the incremented values of the input data signals DI<7...4> only when the carry-out signal CO1 from the block DINC4(a) is at a high level (CO1=1). Thus, the select signal S for the block DINC4(b) is connected to the carry-out signal CO1 via inverters I1 and I2. The output data signals DO<11...8> assumes the incremented values of DI<11...8> only when both the carry-out signal CO1 from the block DINC4(a) and the carry-out signal CO2 from the block DINC4(b) are at a high level (CO1=1 and CO2=1). Thus, the select signal for the block DINC4(c) is connected to the output of an AND gate I3 which combines logically the signals CO1 and CO2.

By way of illustration, when DI<11...8>=1111; DI<7...4>=1111; and DI<3...0>=1101, then DO<11...8>=1111; DO<7...4>=1111; and DO<3...0>=1110. Accordingly, the carry-out signal CO1 was at a low level so that no values were incremented in the blocks DINC4(b) and DINC4(c). However, when DI<11...8>=1111; DI<7...4>=0111; and DI<3...0>=1111, then DO<11...8>=1111; DO<7...4>=1000; and DO<3...0>=0000. Therefore, the carry-out signal CO1 was high and the carry-out signal CO2 was low so that all the bits were incremented in both of the blocks DINC-4(aI) and DINC4(b).

The worst case for the evaluation time for a 12-bit incrementer is given by the following equation:

$$TE12 = T1 + T2 + T3$$

Where
TE12 = the time it takes from the rising edge of the precharge signal CLK for all the twelve data out bits to be valid,
T1 = the worst case time to evaluate the carry-out signal of a DINC4 block,
T2 = the delay through the logic which generates the select signals S and S* for the last DINC4 block,
T3 = the delay through the output section of the incrementer or DINC cell after the select signals S and S* are ready.

A 16-bit incrementer would require four DINC4 blocks and would have the worst case valuation time as set forth in the following equation:

$$TE16 = T1 + T4 + T3$$

Where
T1 = (same as above)
T3 = (same as above)
T4 = the delay through the logic which generates the select signals S and S* for the fourth DINC4 block.

The time T2 for a 12-bit incrementer is the delay of a two-input AND gate plus an inverter. The delay time T4 for the 16-bit incrementer is the delay through a three-input AND gate and an inverter. Accordingly, it can thus be seen that higher bit counts can be increased without significantly increasing the increment time.

Figure 9A:
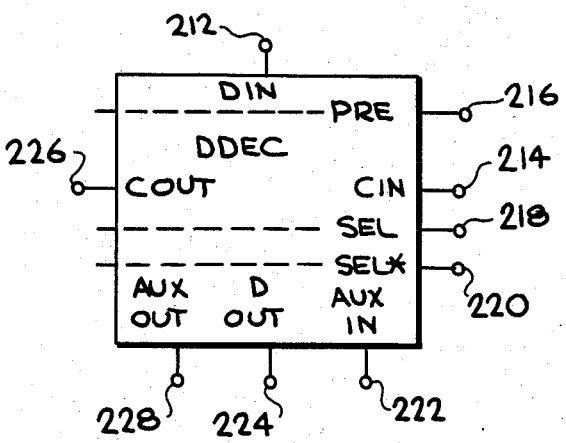
FIG. 9(a) is a block diagram of a decrementer cell of the present invention.

Referring now to FIG. 9(a), wherein is shown a block diagram of a CMOS decrementer cell 210 of the present invention designated as DDEC. The decrementer cell 210 receives six input logic signals consisting of an input data signal DIN on terminal 212, an input carry signal CIN on terminal 214, a precharge clock signal PRE on terminal 216, a select control signal SEL on terminal 218, a signal SEL* on terminal 220 which is a complement of the select control signal, and auxiliary input signal AUXIN on terminal 222. The decrementer cell provides three output signals consisting of a data out signal DOUT on terminal 224, a carry-out signal COUT on terminal 226, and an auxiliary output signal AUXOUT on terminal 228.

Figure 9B:
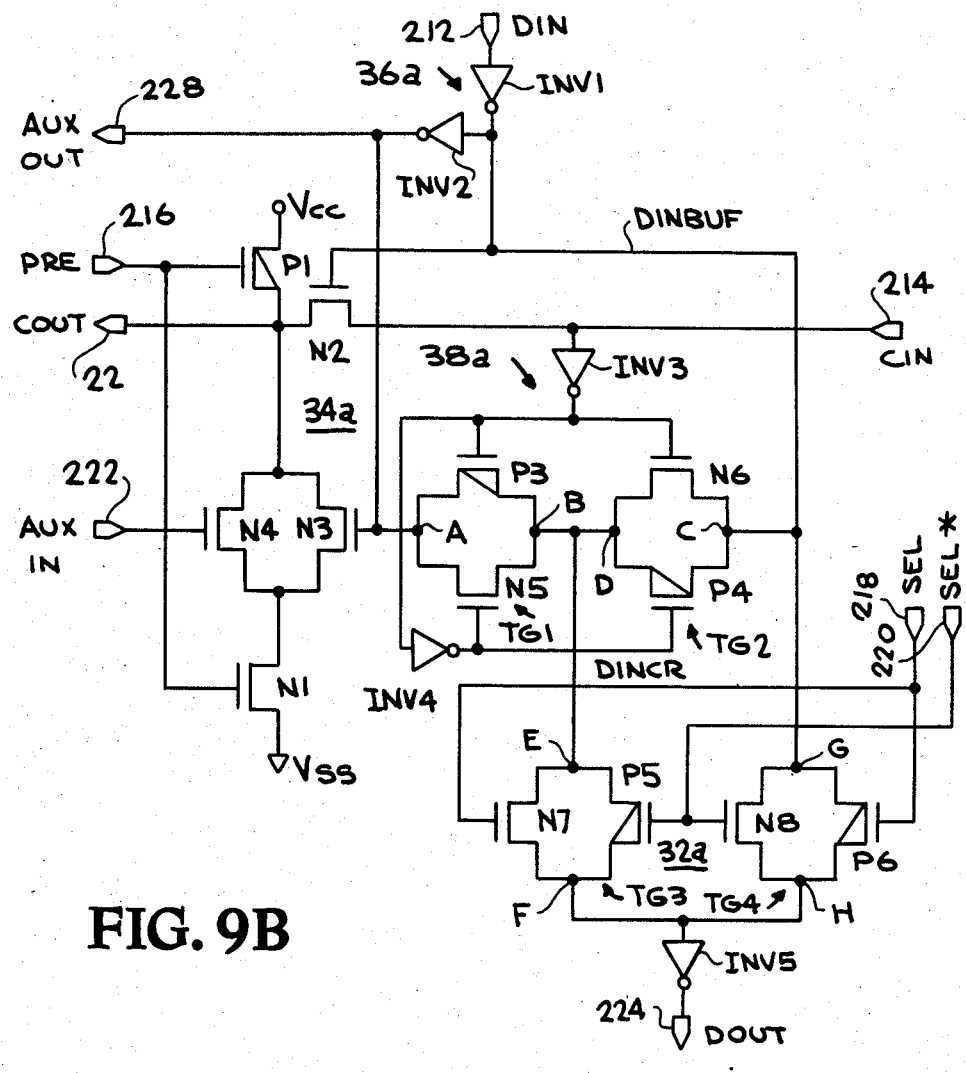
FIG. 9(b) is a detailed schematic circuit diagram of the decrementer cell of FIG. 9(a).

In FIG. 9(b), there is illustrated a detailed circuit diagram of the decrementer or DDEC cell 210 of FIG. 9(a). The DDEC cell is formed of an input section 30a, an output section 32a, and a carry section 34a. The input section 30a functions to perform the decrement function and consists of a buffer stage 36a and a decrementer stage 38a. The decrementer stage 38a and the carry section 34a are identical in construction as the incrementer stage 38 and the carry section 34 of FIG. 1(b). The output section 32a is the same as the output section 32 of FIG. 1(b) except that a fifth inverter INV5 is interconnected between nodes F, H and the terminal 224. The buffer stage 36a has been modified from the buffer stage 36 of FIG. 1(b) so that (1) the auxiliary output signal AUXOUT is from the output of the second inverter INV2 rather than the first inverter INV1, and (2) the intermediate signal DINBUF is from the output of the first inverter INV1 rather than the second inverter INV2. Except for these changes, the circuit components of FIGS. 9(b) and their operation is identical to that of FIG. 1(b). Thus a detailed discussion of the same will not be repeated. It should also be apparent that each of the DINC cells in FIG. 5(b) may be replaced with a DDEC cell 210 so as to form a 4-bit decrementer. Further, three 4-bit decrementer may be arrayed in a similar manner as in FIG. 8 so as to form a 12-bit decrementer.

The incrementer or decrementer cell of the present invention has advantages over the prior art circuits as follows:

(1) It has a very high speed of operation;
(2) It is formed of a regular structure so as to be suitable for very large scale integration; and
(3) Any number of such cells can be arrayed so as to form an N-bit incrementer/decrementer whose operational speed does not change significantly as the number of bits to increment/decrement increases.

From the foregoing detailed description, it can thus be seen that the present invention provides an improved incrementer cell suitable for high speed operations which includes an input section, an output section and a carry section. Further, any number of such incrementer cells may be connected to form an N-bit incrementer in which the operational speed thereof is not significantly reduced as the number of bits is increased.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. An incrementer cell comprising:

an input section being formed of a buffer stage and an incrementer stage;

said buffer stage having a first inverter and a second inverter, said first inverter having its input coupled to a first input terminal for receiving an input data signal, said second inverter having its input coupled to the ouput of said first inverter;

said incrementer stage being formed of a third inverter, a fourth inverter, a first transmission gate and a second transmission gate, said third inverter having its input coupled to a second input terminal for receiving an input carry signal and its output coupled to the input of said fourth inverter, said outputs of said third and fourth inverters being connected to control nodes of said first and second transmission gates, said first transmission gate having its input node coupled to the output of said first inverter, said second transmission gate having its input node coupled to the output of said second inverter;

an output section being formed of a third transmission gate and a fourth transmission gate, said third transmission gate having its input node coupled to the output nodes of said first and second transmission gates, said fourth transmission gate having its input node coupled to the ouput of said second inverter, said third and fourth transmission gates having their control nodes connected to third and fourth input terminals for receiving a select signal and its complement;

a carry section including a P-channel transistor, a first N-channel transistor, a second N-channel transistor, a third N-channel transistor and a fourth N-channel transistor;

said P-channel transistor having its source connected to a supply potential and its gate connected to the gate of said first N-channel transistor, said P-channel transistor having its drain connected to the source of said second N-channel transistor and to the drains of said third and fourth N-channel transistors;

said first N-channel transistor having its drain connected to the sources of said third and fourth N-channel transistors and its source connected to a ground potential, said second N-channel transistor having its gate connected to the output of said second inverter and its drain connected to said second input terminal, said third N-channel transistor having its gate connected to the output of said first inverter, the common gates of said P-channel transistor and said first N-channel transistors being further connected to a fifth input terminal for receiving a clock signal; and the drain of said P-channel transistor being further connected to a second output terminal to provide a carry-out signal, the gate of said fourth N-channel transistor being connected to a sixth input terminal for receiving an auxiliary input signal, the output of said first inverter being further connected to a third output terminal to provide an output auxiliary signal.

2. An incrementer cell as claimed in claim 1, wherein said first through fourth inverters comprises CMOS inverters, each inverter having a P-channel transistor and an N-channel transistor.

3. An incrementer cell as claimed in claim 1, wherein each of said first through fourth transmission gates comprises a P-channel transistor and an N-channel transistor having their main electrodes connected in parallel.

4. An incrementer cell as claimed in claim 1, wherein a plurality of said incrementer cells are arrayed to form an N-bit incrementer.

5. An incrementer cell as claimed in claim 1, wherein four of said incrementer cells are arrayed to form a 4-bit incrementer.

6. An incrementer cell as claimed in claim 5, wherein the sixth input terminal for receiving the auxiliary input signal and the third output terminal for providing the auxiliary output signal for each of said four incremental cells are interconnected to speed up the time for generating the carry-out signal in the highest bit.

7. An incrementer cell as claimed in claim 5, wherein three of said 4-bit increments are arranged to form a 12-bit incrementer.

8. A decrementer cell comprising:

an input section being formed of a buffer stage and a decrementer stage;

said buffer stage having a first inverter and a second inverter, said first inverter having its input coupled to a first input terminal for receiving an input data signal, said second interver having its inupt coupled to the output of said first inverter;

said decrementer stage being formed of a third inverter, a fourth inverter, a first transmission gate and a second transmission gate, said third inverter having its input coupled to a second input terminal for receiving an input carry signal and its output coupled to the input of said fourth inverter, said outputs of said third and fourth inverters being connected to control nodes of said first and second transmission gates, said first transmission gate having its input node coupled to the output of said second inverter, said second transmission gate having its input node coupled to the output of said first inverter;

an output section being formed of a third transmission gate and a fourth transmission gate, said third transmission gate having its input node coupled to the output nodes of said first and second transmission gates, said fourth transmission gate having its input node coupled to the output of said first inverter, said third and fourth transmission gates having their control nodes connected to third and fourth input terminals for receiving a select signal and its complement;

a carry section including a P-channel transistor, a first N-channel transistor, a second N-channel transistor, a third N-channel transistor and a fourth N-channel transistor;

said P-channel transistor having its source connected to a supply potential and its gate connected to the gate of said first N-channel transistor, said P-channel transistor having its drain connected to the source of said second N-channel transistor and to the drains of said third and fourth N-channel transistors;

said first N-channel transistor having its drain connected to the sources of said third and fourth N-channel transistors and its source connected to a ground potential, said second N-channel transistor having its gate connected to the output of said first inverter and its drain connected to said second input terminal and third N-channel transistor having its gate connected to the output of said second interter, the common gates of said P-channel transistor and said first N-channel transistors being further connected to a fifth input terminal for receiving a precharge clock signal; and the drain of said P-channel transistor being further connected to a second output terminal to provide a carry-out signal, the gate of said fourth N-channel transistor being connected to a sixth input terminal for receiving an auxiliary input signal, the output of said second inverter being further connected to a third output terminal to provide an output auxiliary signal.

9. A decrementer cell as claimed in claim 8, wherein said first through fifth inverters comprises CMOS inverters, each inverter having a P-channel transistor and an N-channel transistor.

10. A decrementer cell as claimed in claim 8, wherein each of said first through fourth transmission gates comprises a P-channel transistor and an N-channel transistor having their main electrodes connected in parallel.

11. A decrementer cell as claimed in claim 8, wherein a plurality of said decrementer cells are arrayed to form an N-bit decrementer.

12. A decrementer cell as claimed in claim 8, wherein four of said decrementer cells are arrayed to form a 4-bit decrementer.

13. A decrementer cell as claimed in claim 12, wherein the sixth input terminal for receiving the auxiliary input signal and the third output terminal for providing the auxiliary output signal for each of said four decrementer cells are interconnected to speed up the time for generating the carry-out signal in the highest bit.

14. A decrement cell as claimed in claim 12, wherein three of said 4-bit decrementers are arranged to form a 12-bit decrementer.

15. An incrementer comprising:

input means responsive to an input data signal and an input carry signal for generating an incremented output signal;

said input means including a buffer stage formed of first and second inverters, said first inverter having its input coupled to the input data signal, said second inverter having its input coupled to the output of said first inverter, the output of said second inverter providing an intermediate signal with the same logic state as said input data signal;

said input means further including an incrementer stage which comprises a first multiplexer means responsive to the intermediate signal and the input carry signal for generating the incremented output signal;

output means coupled to said input means for generating a data out signal to be either the incremented output signal or the input data signal;

said output means including a second multiplexer means responsive to the intermediate signal and the incremented output signal for selecting the data out signal to be either the incremented output signal or the input data signal;

carry means responsive to said input data signal and said input carry signal for generating a carry-out signal; and said carry means including means responsive to a clock signal for precharging the carry-out signal to a high logic state.

16. An incrementer cell as claimed in claim 15, wherein said carry means further includes means for discharging the high logic state of the carry-out signal.

* * * * *